(12) United States Patent
Harris et al.

(10) Patent No.: US 7,003,895 B2
(45) Date of Patent: Feb. 28, 2006

(54) TAPE MEASURE HAVING A SELF-POWERED REEL ASSEMBLY

(75) Inventors: George P. Harris, Dunedin, FL (US); William C. Clontz, Greensboro, NC (US)

(73) Assignee: U.S. Tape Company, Inc., Patchoque, NY (US)

( * ) Notice: Subject to any disclaimer, the term of this patent is extended or adjusted under 35 U.S.C. 154(b) by 0 days.

(21) Appl. No.: 10/264,293

(22) Filed: Oct. 3, 2002

(65) Prior Publication Data

US 2004/0064961 A1    Apr. 8, 2004

(51) Int. Cl.
*G01B 3/10*    (2006.01)

(52) U.S. Cl. .................................. 33/755; 242/378
(58) Field of Classification Search ................ 33/755, 33/759, 760, 761, 764, 769; 242/378, 378.1, 242/378.2
See application file for complete search history.

(56) References Cited

U.S. PATENT DOCUMENTS

| | | | |
|---|---|---|---|
| 889,570 A | 6/1908 | Ayers | |
| 1,218,798 A | 3/1917 | Nelson | |
| 1,237,808 A * | 8/1917 | Ottinger | 33/760 |
| 2,219,201 A * | 10/1940 | Smith | 242/378 |
| 2,549,098 A * | 4/1951 | Joseph | 242/381.3 |
| 2,576,041 A * | 11/1951 | Pitts | 33/755 |
| 2,606,067 A * | 8/1952 | Roark | 242/378 |
| 2,833,027 A * | 5/1958 | Foster | 242/373 |
| 3,054,573 A * | 9/1962 | Spencer | 242/375.1 |
| 3,119,424 A | 1/1964 | Henry | |
| 3,885,314 A * | 5/1975 | Banas, Sr. | 33/764 |
| 4,084,764 A * | 4/1978 | Mogerlein et al. | 242/373 |
| 4,153,996 A | 5/1979 | Rutty | |
| 4,171,109 A * | 10/1979 | Roe | 33/769 |
| 4,434,952 A | 3/1984 | Czerwinski et al. | |
| 4,479,617 A * | 10/1984 | Edwards | 33/761 |
| 4,635,755 A * | 1/1987 | Arechaga | 242/530.2 |
| 4,930,227 A | 6/1990 | Ketchpel | |
| 4,972,601 A | 11/1990 | Bickford et al. | |
| 5,119,521 A | 6/1992 | Clontz | |
| D342,687 S | 12/1993 | Kang | |
| 5,531,395 A * | 7/1996 | Hsu | 33/767 |
| 5,746,004 A * | 5/1998 | Wertheim | 33/769 |
| 5,820,057 A * | 10/1998 | Decarolis et al. | 33/761 |
| 6,272,765 B1 * | 8/2001 | Li | 33/769 |
| 6,324,769 B1 | 12/2001 | Murray | |
| 6,349,482 B1 * | 2/2002 | Gilliam | 33/755 |
| 6,464,160 B1 * | 10/2002 | Hsu | 33/761 |

* cited by examiner

*Primary Examiner*—Christopher W. Fulton
(74) *Attorney, Agent, or Firm*—MacCord Mason PLLC

(57) ABSTRACT

A tape measure having a self-powered reel assembly and a housing for receiving the self-powered, reel assembly. The self-powered, reel assembly includes: a primary spool having a measuring tape wound upon the primary spool; a secondary biased spool assembly; and a coupler for connecting the primary spool to the secondary biased spool assembly for retracting the primary spool. In the preferred embodiment, the secondary biased spool assembly includes a spring spool, a spring drive spool, and a backwound spring.

44 Claims, 12 Drawing Sheets

TAPE MEASURE HAVING A SELF-POWERED REEL ASSEMBLY

BACKGROUND OF THE INVENTION (1) Field of the Invention

The present invention relates generally to tape measures and, more particularly, to an improved tape measure having a self-powered, reel assembly designed to better fit in a workman's hand more ergonomically than a conventional tape measure.

(2) Description of the Prior Art

Workmen typically use hand-held tape measures to measure lumber, distances between points, and a variety of other things connected with their work. The conventional tape measure typically carried may comprise a metal or plastic housing with an elongated strip of flexible material of a selected length, such as twenty-five feet or more. The elongated strip of material may be metal, alloy, plastic, or cloth marked with suitable units of measurement and wound around a spring-loaded shaft within the housing.

In use, the free end of the tape is pulled far enough from the housing to expose enough tape to perform the desired measurement. When released, the spring-loaded shaft retracts the tape into the housing. Smaller tape measures are relatively easy to hold with one hand but larger tape measures pose problems. Such tape measures are awkward and difficult to handle because the elongated strip of material is wound together around a spring-loaded shaft within the housing, making a twenty-five foot tape measure too large for most workman to hold ergonomically in one hand.

Thus, there remains a need for a new and improved tape measure that includes a self-powered, reel assembly while, at the same time, is ergonomically designed and fits comfortably in a workman's hand.

SUMMARY OF THE INVENTION

The present invention is directed to a tape measure having a self-powered reel assembly and a housing for receiving the self-powered, reel assembly. The self-powered, reel assembly includes: a primary spool having a measuring tape wound upon the primary spool; a secondary biased spool assembly; and a coupler for connecting the primary spool to the secondary biased spool assembly for retracting the primary spool.

In the preferred embodiment, the secondary biased spool assembly includes a spring spool, a spring drive spool, and a backwound spring. The primary spool is a take-up spool. The ratio of the diameter of the primary spool to the diameter of the secondary biased spool assembly is less than 1 to 1 for increasing the mechanical advantage of the secondary biased spool assembly. Because of the increased mechanical advantage of the backwound spring, it may be substantially relaxed at rest.

In the preferred embodiment, the coupler includes a first drive gear on the primary spool and a second drive gear on the spring drive spool. Also, the coupler may further include a spacer gear between the first drive gear and the second drive gear. In the preferred embodiment, the number of teeth on the spacer gear is about equal to the number of teeth on the first drive gear of the primary spool.

The housing may further includes grips such as finger grips. Also, the housing may further include a lock actuator for selectively clamping the measuring tape at a desired position during use. In addition, the housing may further include a belt clip attached to the housing such as a tool belt clip for attaching the tape measure to a tool belt. The housing may further include a tape bumper for reducing the impact of the end of the tape against the housing when the tape is retracted.

In the preferred embodiment, the housing may be opened to replace the measuring tape and re-assembled using a plurality of fasteners for closing the housing. Also, because of the design of the self-powered reel assembly, the housing is generally rectangular and hand sized.

The housing includes at least one chamber for receiving the primary spool; the secondary biased spool assembly; and the coupler. However, the housing may include at least two chambers. In the preferred embodiment, at least one of the chambers is sealed to prevent outside elements from entering the sealed chamber.

The measuring tape itself is generally conventional and includes measuring indicia in predetermined increments. In addition, the measuring tape includes an end stop to prevent the measuring tape from retracting completely into the housing.

Accordingly, one aspect of the present invention is to provide a tape measure having a self-powered, reel assembly comprising: a primary spool having a measuring tape wound upon the primary spool; a secondary biased spool assembly; and a coupler for connecting the primary spool to the secondary biased spool assembly for retracting the primary spool.

Another aspect of the present invention is to provide a self-powered, reel assembly for use in a tape measure, the self-powered reel assembly comprising: a primary spool; a secondary biased spool assembly having (i): a spring spool; (ii) a spring drive spool; and (iii) a backwound spring; and a coupler for connecting the primary spool to the secondary biased spool assembly for retracting the primary spool.

Still another aspect of the present invention is to provide a tape measure, said tape measure comprising: a self-powered, reel assembly including: (i) a primary spool having a measuring tape wound upon said primary spool; (ii) a secondary biased spool assembly having a spring spool, a spring drive spool, and a backwound spring; (iii) a coupler for connecting said primary spool to said secondary biased spool assembly for retracting said primary spool; and a housing for receiving said self-powered, reel assembly.

These and other aspects of the present invention will become apparent to those skilled in the art after a reading of the following description of the preferred embodiment when considered with the drawings.

DESCRIPTION OF THE PREFERRED EMBODIMENTS

In the following description like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 1:
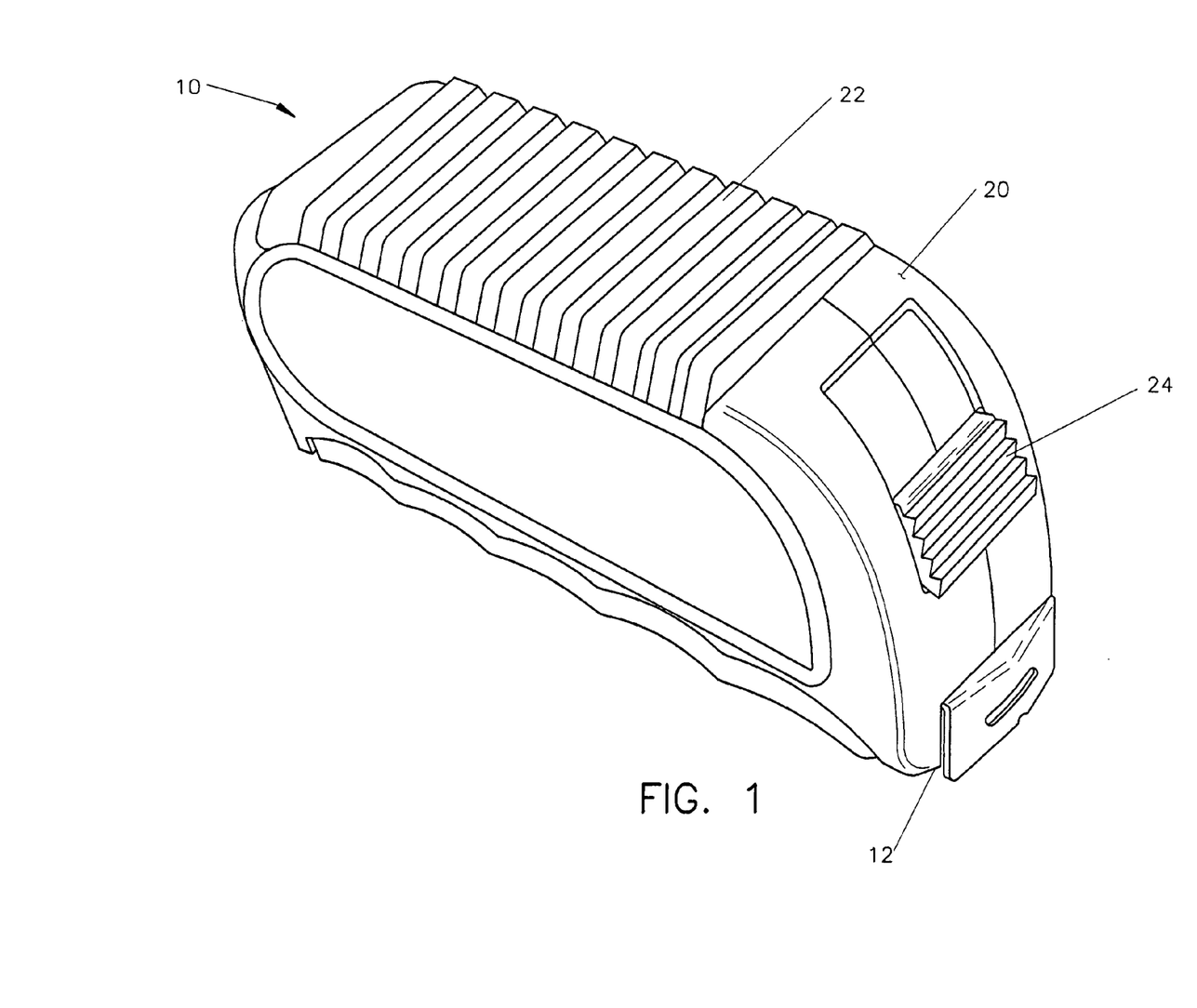
FIG. 1 is a perspective view of a tape measure having a self-powered reel assembly constructed according to the present invention.

Referring now to the drawings in general and FIG. 1 in particular, it will be understood that the illustrations are for the purpose of describing a preferred embodiment of the invention and are not intended to limit the invention thereto. As best seen in FIG. 1, a tape measure having a self-powered reel assembly, generally designated 10, is shown constructed according to the present invention. The tape measure 10 includes a housing 20 for encasing the self-powered reel assembly. The tape measure also includes a grip 22 for holding the tape measure and a lock actuator 24 for selectively clamping the tape 36 of the tape measure 10 at a desired distance during use.

Figure 2:
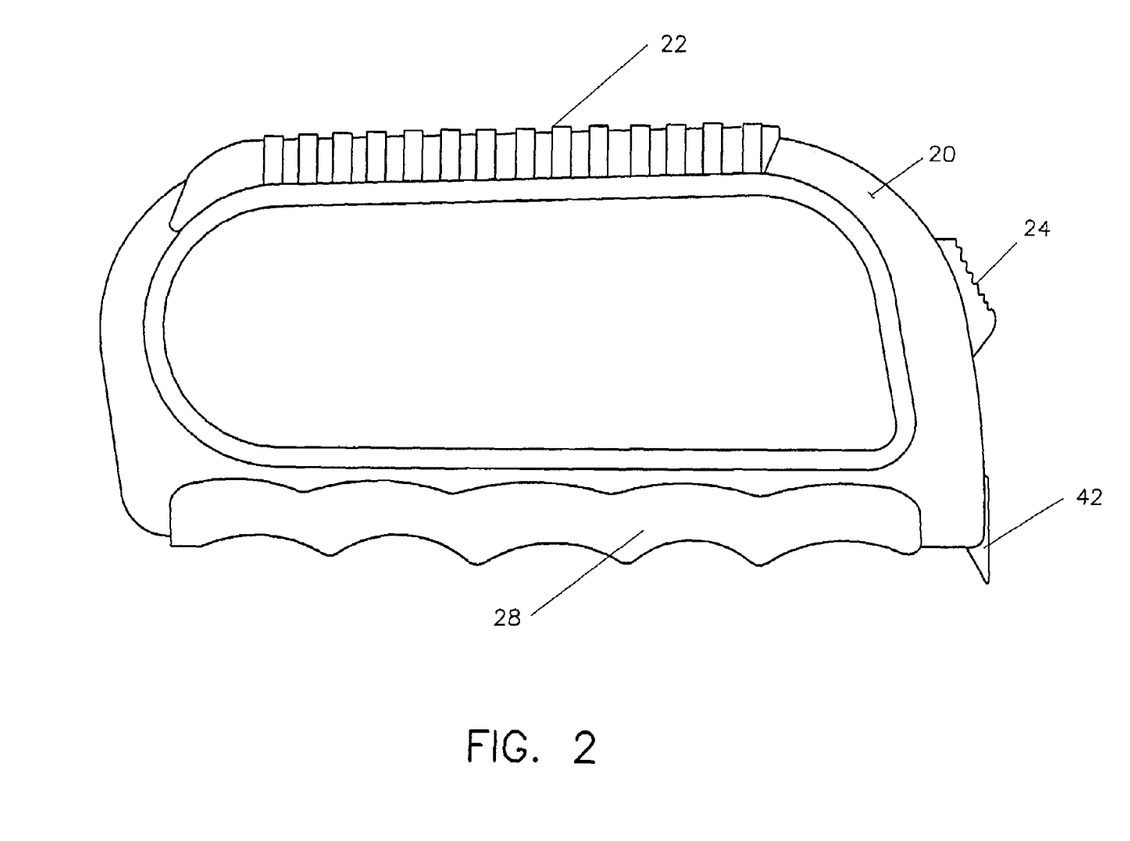
FIG. 2 is a side view of the tape measure shown in FIG. 1.

FIG. 2 is a side view of the tape measure 10 also illustrating grip 22 and finger grips 28 for holding the tape measure; lock actuator 24 for selectively clamping the tape 36 of the tape measure at a desired distance during use; and stop 42 at the end of the tape 36 to prevent the tape from retracting into the tape measure housing 20.

Figure 3:
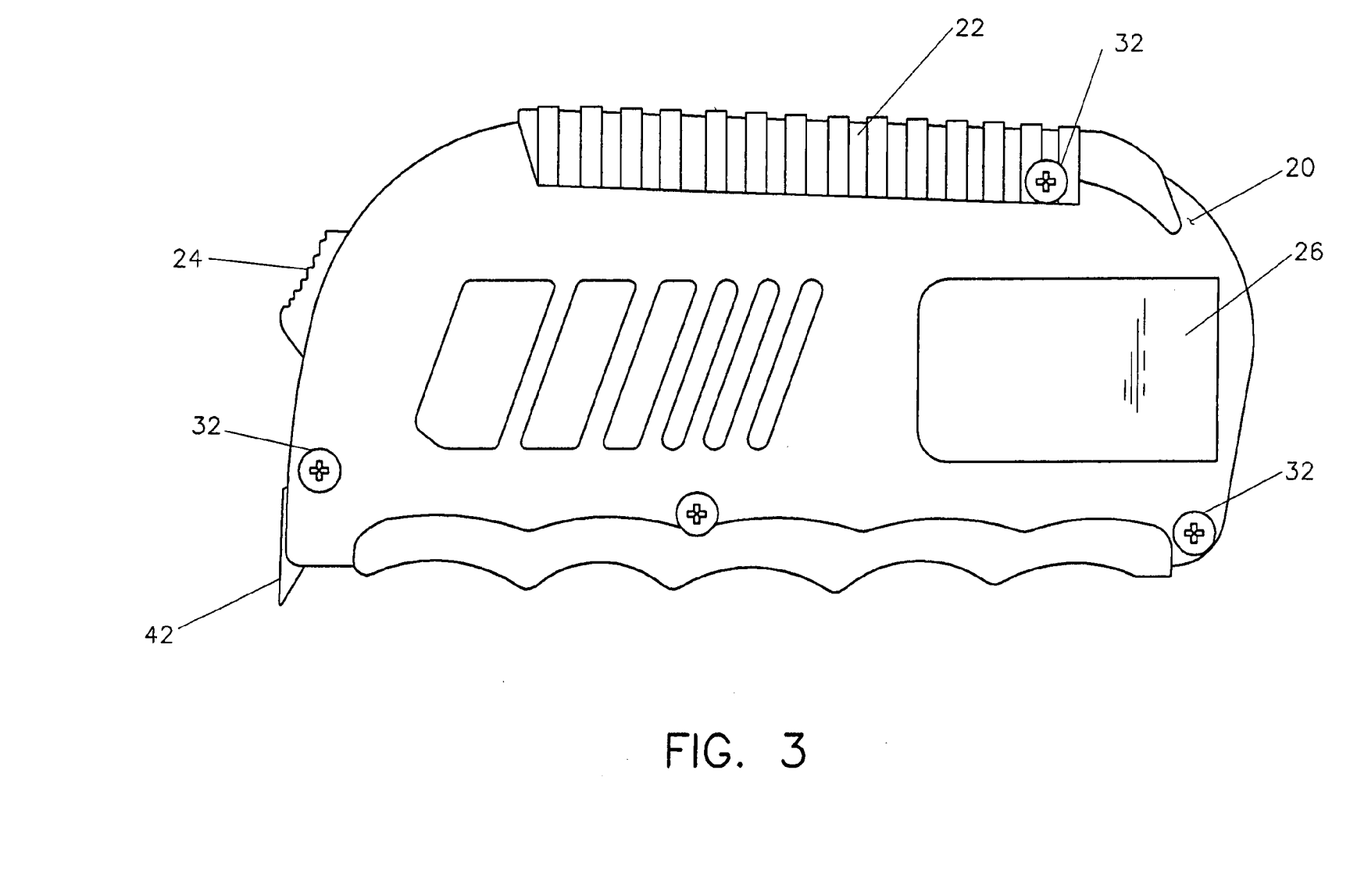
FIG. 3 is a back view of the tape measure shown in FIG. 1.

FIG. 3 is a back view of the tape measure 10 showing a belt clip 26 which is a tool belt clip for carrying the tape measure on a tool belt. Housing 20 also includes a plurality of fasteners 32 for enclosing the self-powered reel assembly within the housing 20.

Figure 4:
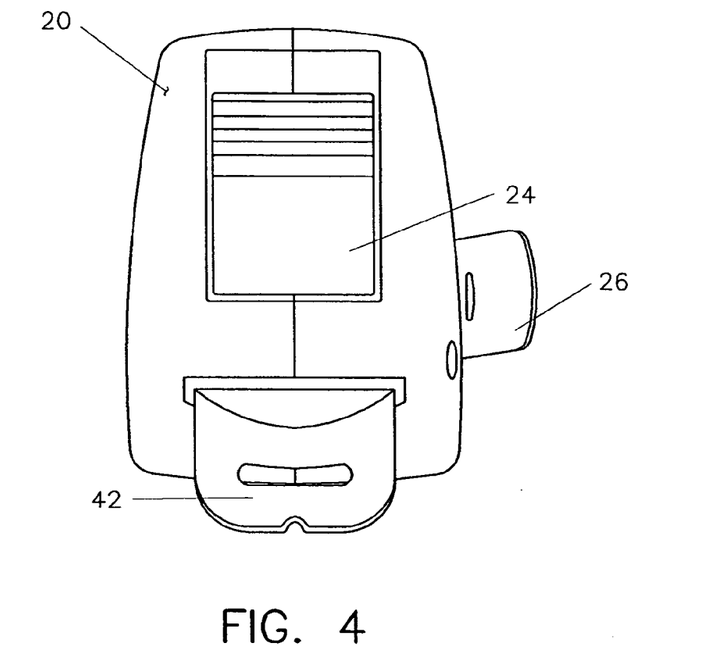
FIG. 4 is a front view of the tape measure shown in FIG. 1.

FIG. 4 is a front view of the tape measure 10 further illustrating stop 42 on the end of tape 36 for preventing the tape from retracting into the tape measure housing 20.

Figure 5:
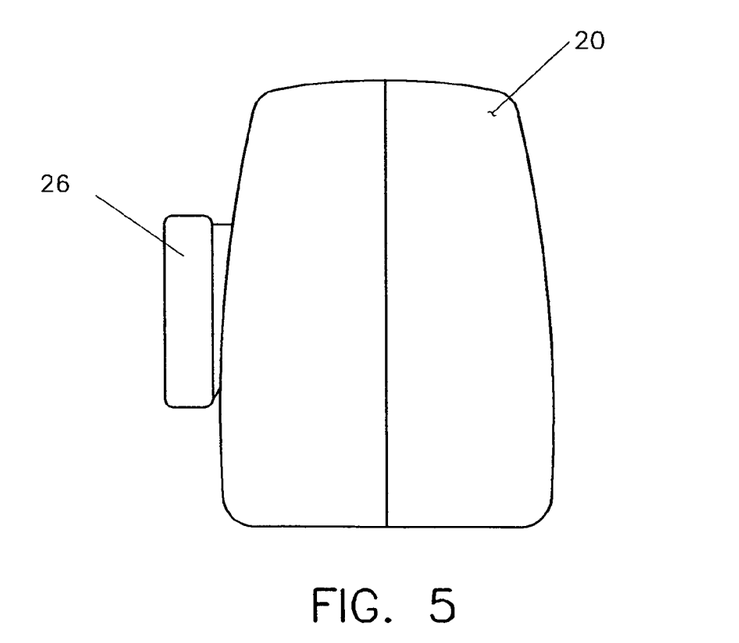
FIG. 5 is a back view of the tape measure shown in FIG. 1.

FIG. 5 is a back view of the tape measure 10.

Figure 6:
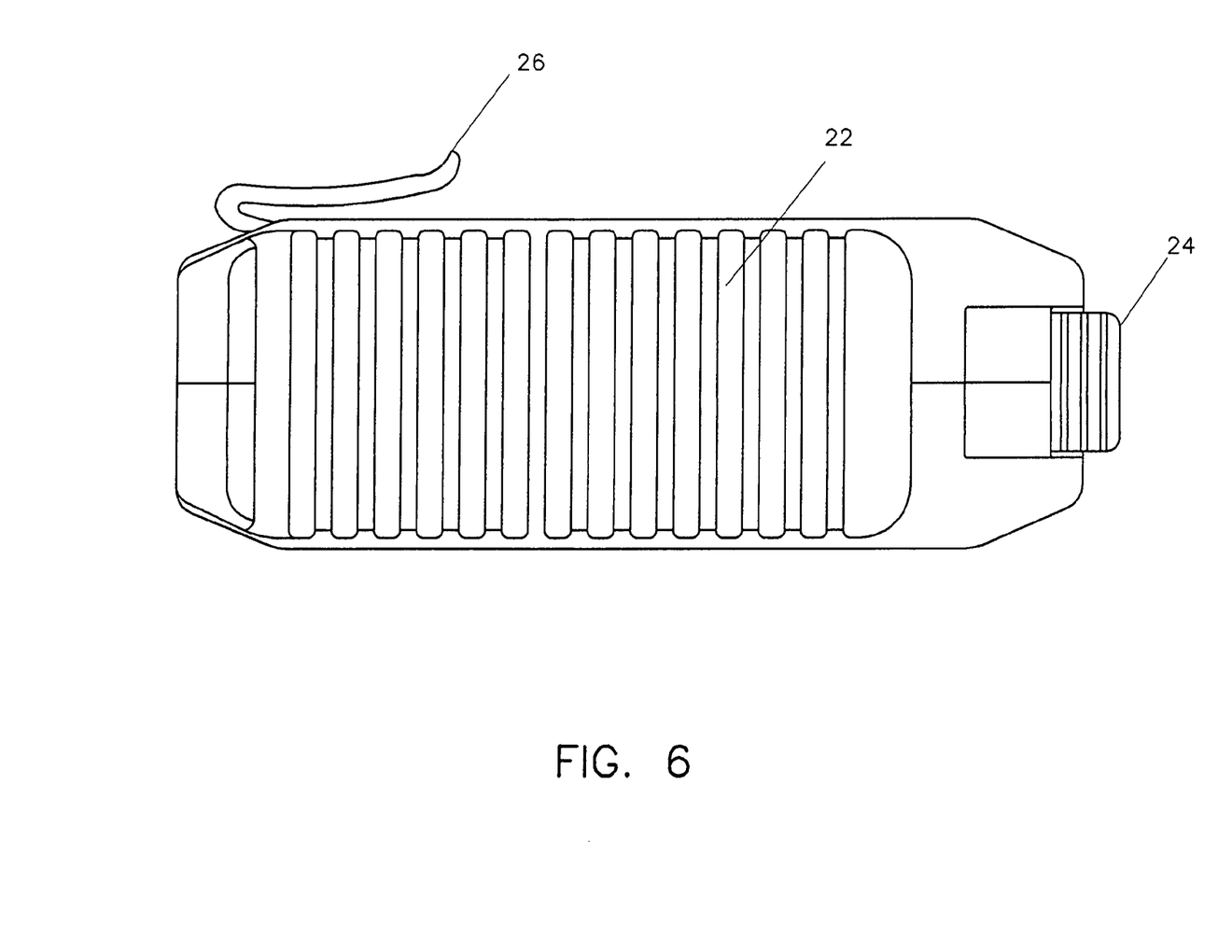
FIG. 6 is a top view of the tape measure shown in FIG. 1.

FIG. 6 is a top view of the tape measure 10.

Figure 7:
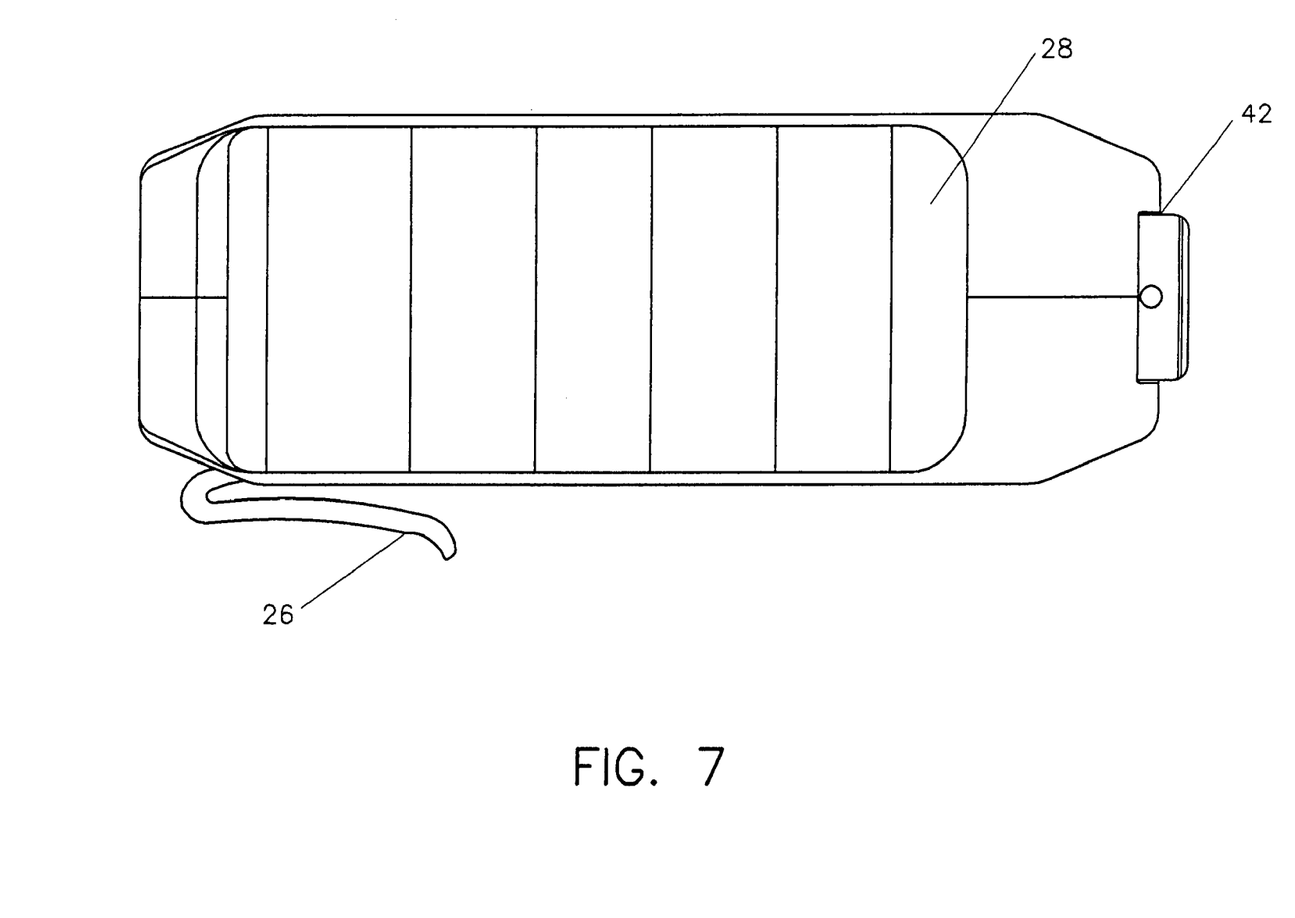
FIG. 7 is a bottom view of the tape measure shown in FIG. 1.

FIG. 7 is a bottom view of the tape measure 10.

Figures 8A, 8B:
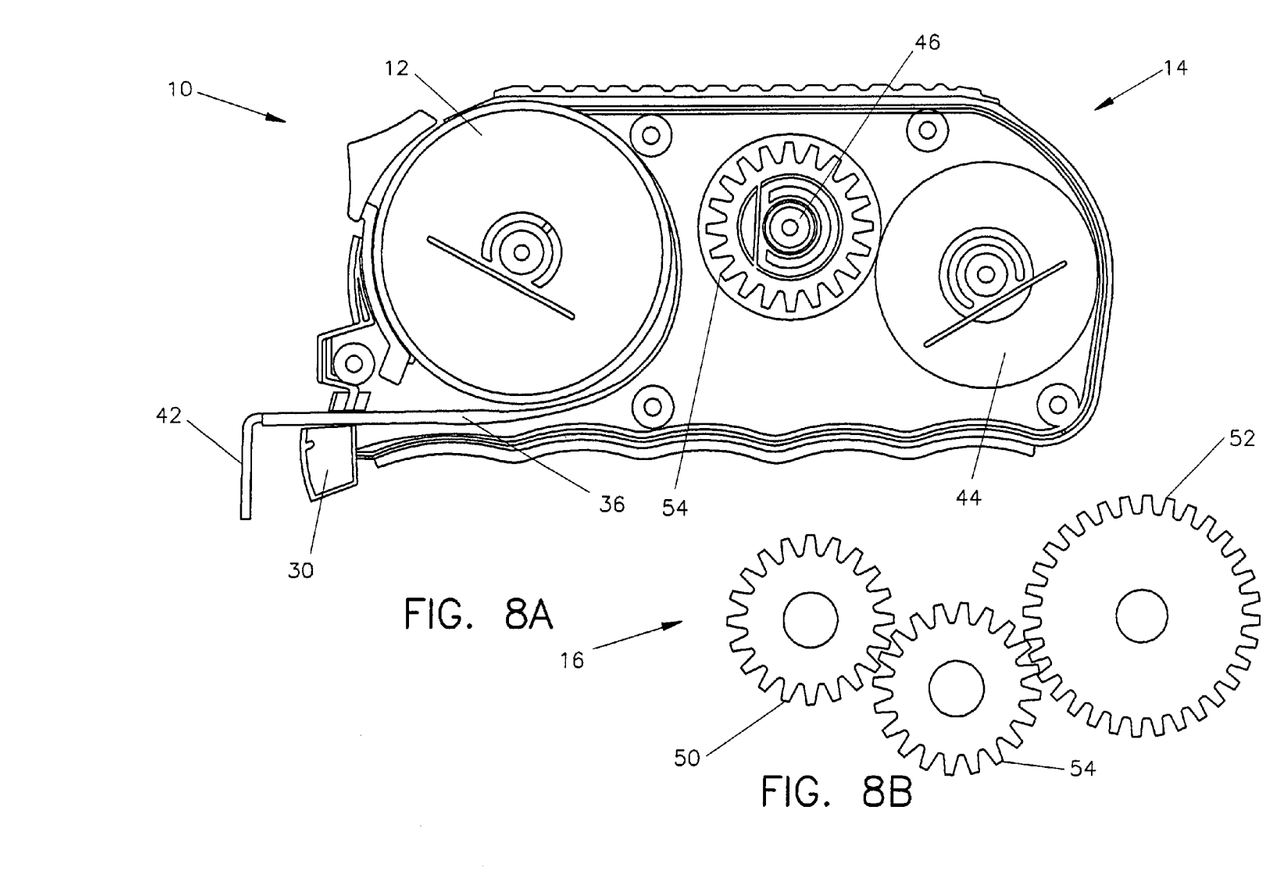
FIGS. 8A and 8B is a side view of the tape measure wherein the housing has been removed to show the self-powered reel assembly and its gear arrangement.

FIGS. 8A and 8B are side views of the tape measure 10 wherein the housing 20 has been removed to show the self-powered reel assembly 18 and its gears. Also, a tape bumper 30 can be seen which reduces impact of the end of the tape 36 against the housing 20 when the tape is retracted. The self-powered reel assembly 18 includes a primary spool 12, which is a take up spool for storing tape 36. The self-powered reel assembly further includes a secondary spool assembly 14 having a spring spool 44, a spring drive spool 46 and a backwound spring 48. In the preferred embodiment, the diameter ratio of the primary spool 12 to the spring drive spool 46 is less than 1:1 for increasing its mechanical advantage, although the diameter ratio can vary.

In the preferred embodiment, the overall coupling ratio between the primary spool 12 and the spring drive spool 46 is about 5 to 7.

The backwound spring 48 is relaxed when the tape measure 10 is at rest and operates to drive the reel assembly when the tape 36 is pulled from the tape measure. The spring 48 is wound onto the spring drive spool 46 in the opposite direction from that which it is wound on the spring spool 44, which substantially increases the effectiveness of the mechanism in retracting the tape measure.

As can also be seen in FIG. 8B, the self-powered, reel assembly 18 further includes a coupler, generally designated 16. In the preferred embodiment, the coupler 16 includes a first drive gear 50 on the primary up spool 12 and a second drive gear 52 on the spring drive spool 46. The first drive gear 50 is normally hidden behind the take up spool from the view shown in FIGS. 8–11, but has been added to the drawings for clarity. In the preferred embodiment, the number of teeth on the spring drive spool gear 52 is greater than the number of teeth on the take up spool gear 50. In the preferred embodiment of the invention, the spring drive spool gear includes about 26 teeth.

In the preferred embodiment, the coupler 16 further includes a spacer gear 54, between the spring drive spool 46 and the take up spool 12. In the preferred embodiment of the invention, the number of teeth on the spacer gear 54 is equal to the number of teeth on the take up spool gear 50. In the preferred embodiment of the present invention, the take up spool gear 50 and the spacer gear 54 each have eighteen teeth. In this configuration, the overall coupling ratio between the primary spool 12 and the spring drive spool 46 is still about 5 to 7

Figure 9:
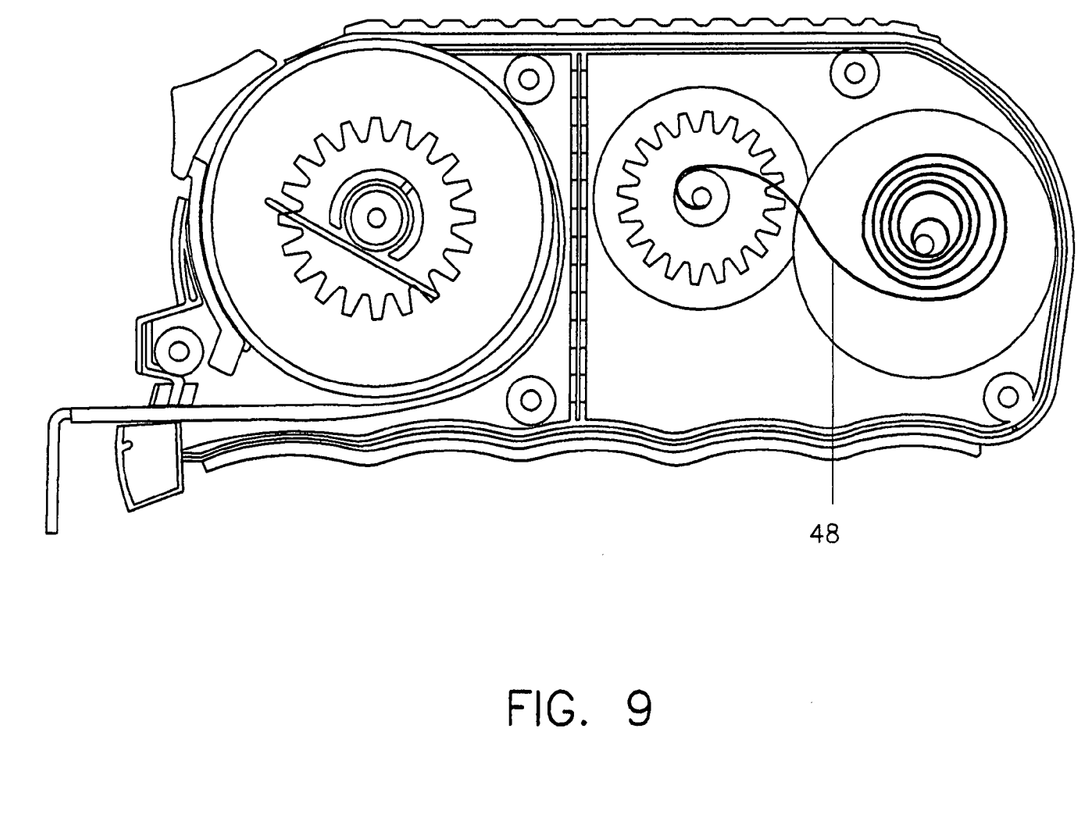
FIG. 9 is a side view of the tape measure shown in FIG. 1 wherein the housing has been removed to show the backwound spring in the self-powered reel assembly.
Figure 10:
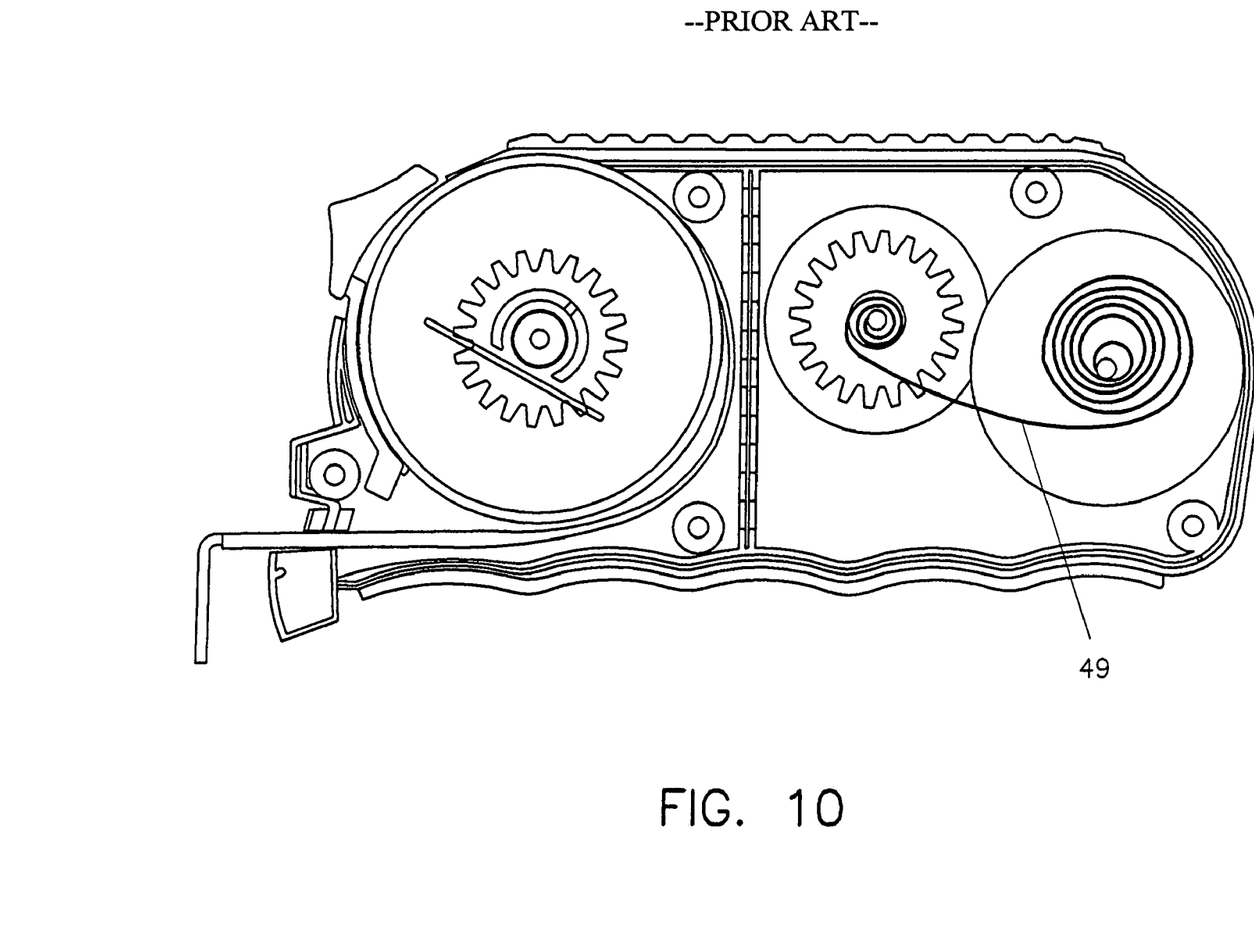
FIG. 10 is a side view of the tape measure shown in FIG. 1 wherein the housing has been removed to show a conventional, dual wound spring in the self-powered reel assembly.
Figure 11:
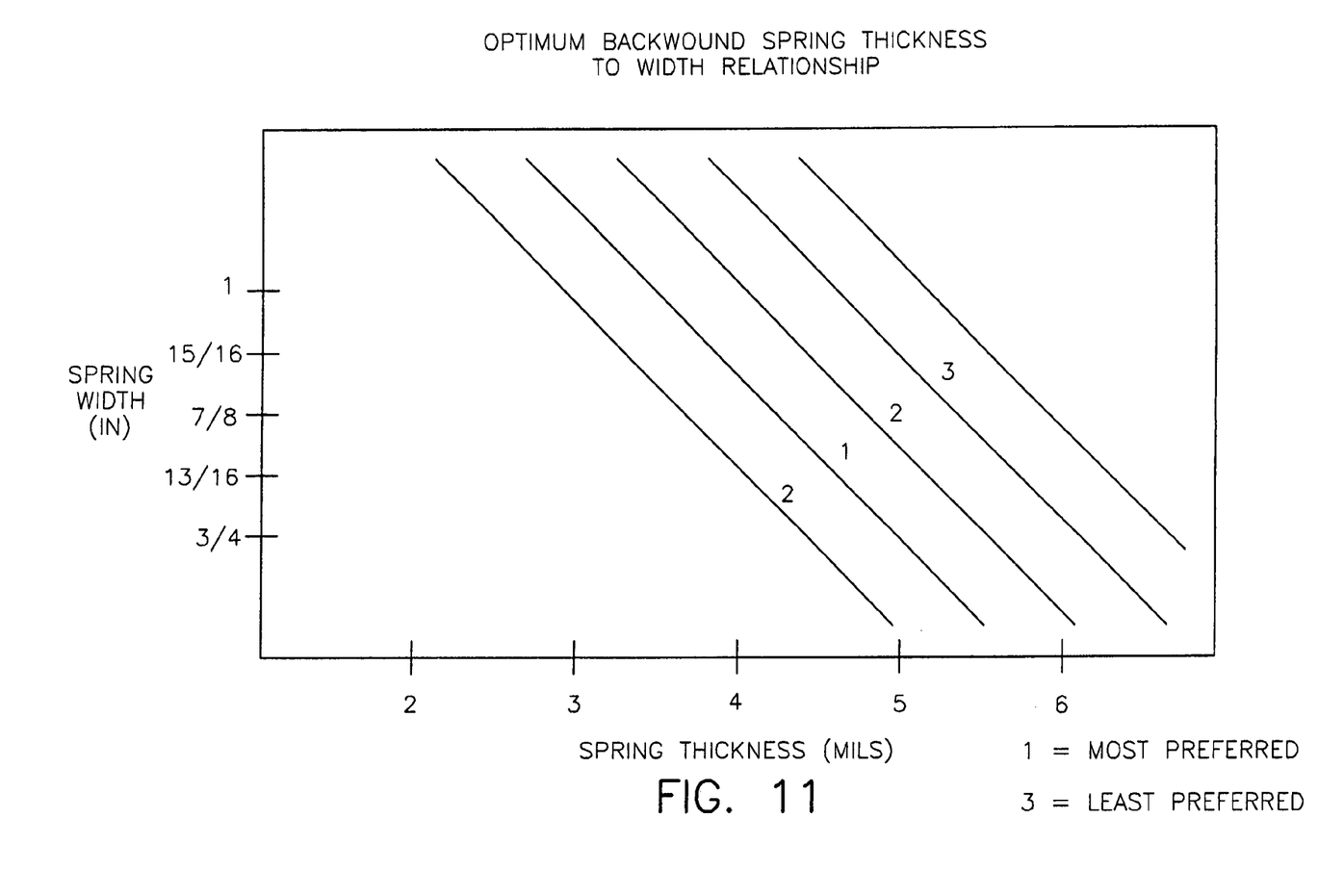
FIG. 11 is a graph of the strength of the backwound spring as a function of the spring thickness and width.

FIG. 9 is a side view of the backwound spring 48 used in the self-powered reel assembly and FIG. 10 shows a spring 49 that is not backwound. It was discovered during the development of the self-powered reel assembly that has backwound spring 48, as shown in FIG. 9, has more strength needed to retract the tape into the housing after measurements are performed with the tape measure than the conventionally wound spring 49.

The conventionally wound spring 49 shown in FIG. 10 may be designed to be suitable for retracting a tape measure; however, the spring spool would be much larger than the backwound spring 48 shown in FIG. 9. Thus, the use of the more, compact backwound spring 48 permits a smaller, more ergonomic, "hand size" design which contributes to the commercially viability of the tape measure.

It also was discovered through experimentation during development of the tape measure that a back wound spring of about 5 mils (0.005 in.) thickness has the desirable amount of strength to retract the tape measure slowly after measurement when the spring is about 13/16" inches wide and between about 17 and 18 feet long the width of the spring being the dimension extending directly into and out of the page of FIG. 9.

The relationship of the thickness of the spring to the width of the backwound spring at a given length and strength is generally inversely proportional. In other words, if the width of the spring is increased by about 25%, the thickness of the spring can be decreased by about 25%, and the strength of the backwound spring will remain approximately constant. A graph depicting this relationship is shown as FIG. 11 wherein the points along the graph are suitable spring width and thickness combinations for retracting a twenty-five foot tape measure with a backwound spring between about 17 and 18 feet long (coupling ratio of about 5:7).

Another important characteristic of the backwound spring 48 shown in FIG. 9 is that it does not have to be anchored in the tape measure, whereas the conventionally wound spring 49, shown in FIG. 10, must be anchored to a stationary shaft or other anchor point. In fact, the backwound spring 48 need not be wound upon a spool to work satisfactorily.

Figure 12:
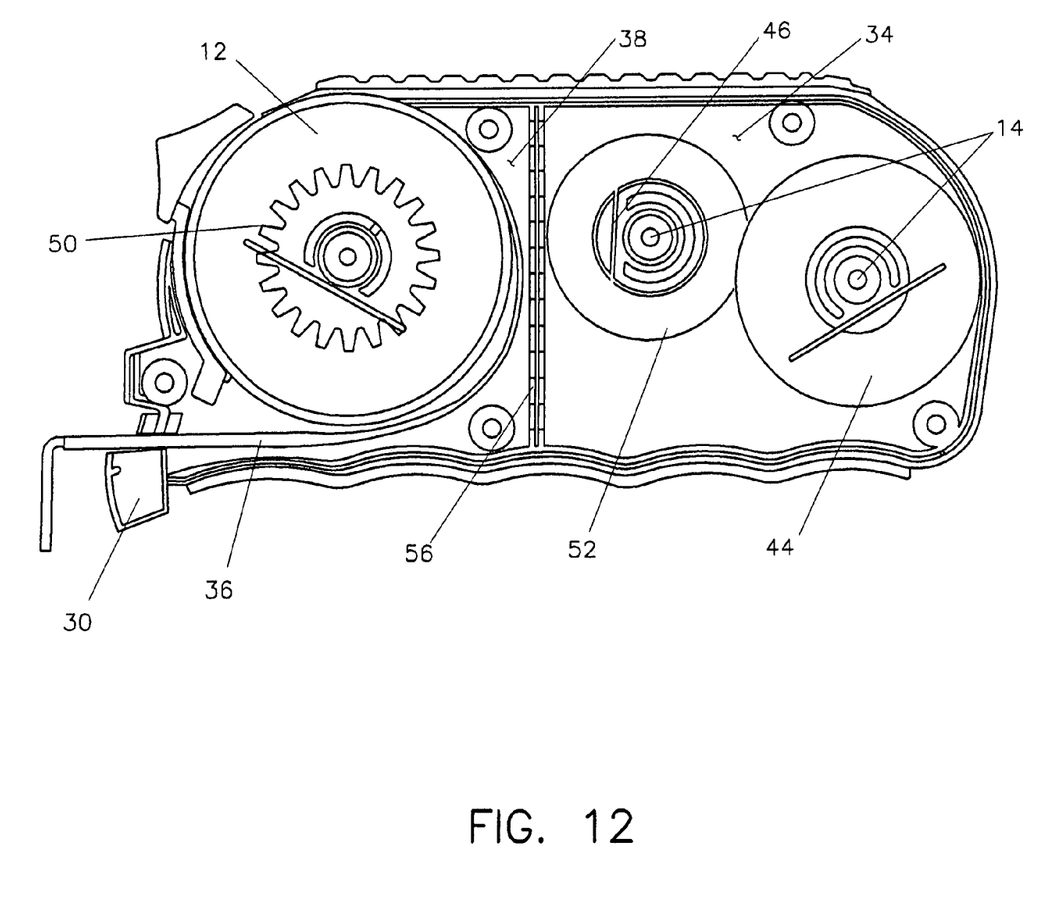
FIG. 12 is a side view of an alternative embodiment of the tape measure shown in FIG. 1 wherein the housing has been removed to show multiple chambers in the housing.

FIG. 12 is a side view of an alternative embodiment of a tape measure 10 having a self-powered reel assembly. This embodiment includes a sealed chamber 38 for separating the primary spool 12 from the secondary spool assembly 14 of the self-powered reel assembly to prevent elements from entering the chamber 38.

Figure 13:
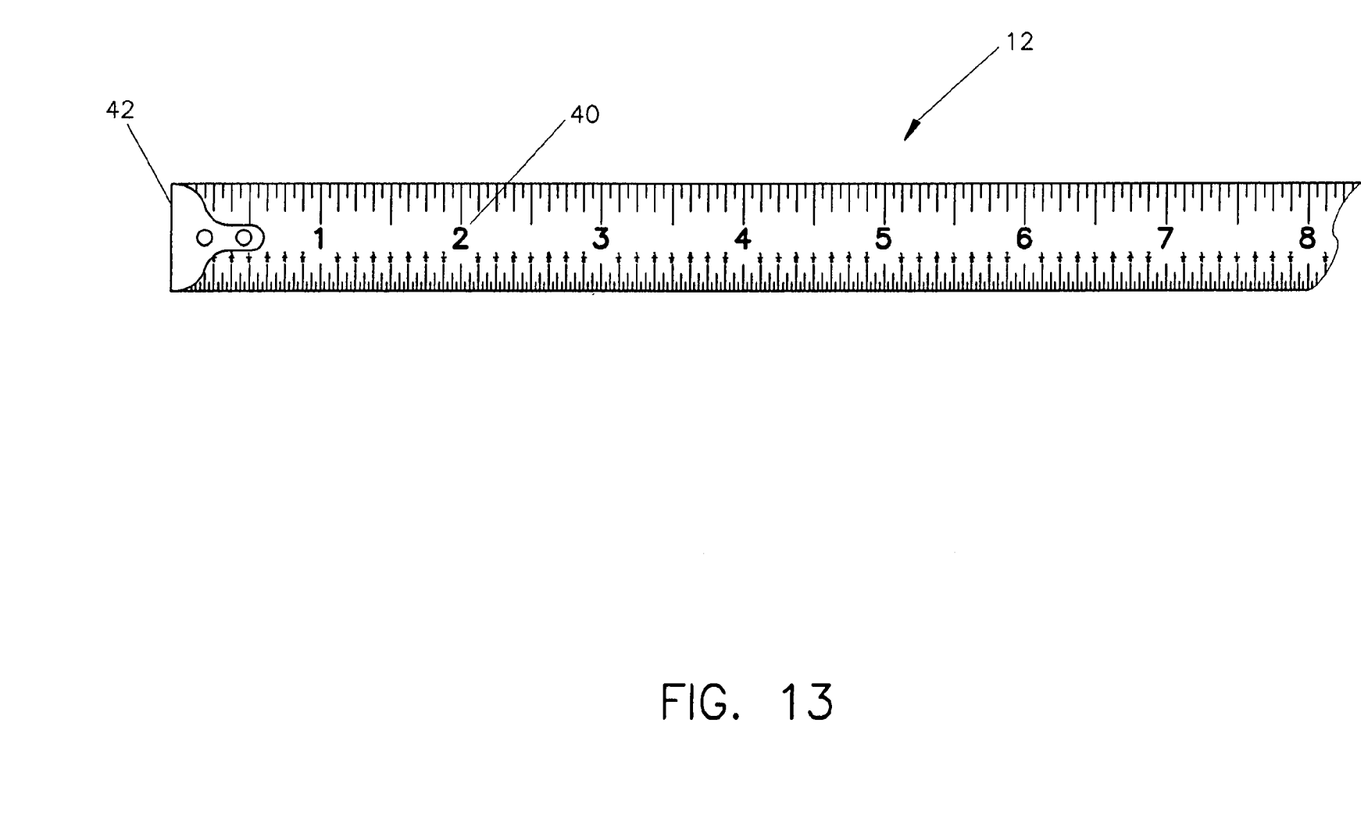
FIG. 13 is a top view of the indicia of a measuring tape for the tape measure of the present invention.

FIG. 13 is a top view of tape 36 for the tape measure 10 having a self-powered reel assembly. The tape 36 is generally conventional and includes indicia 40, of distance and a stop 42 for preventing the tape from retracting into the tape measure housing 20.

In operation, the tape 36 is pulled from the housing 20 with the fingers of one hand while the tape measure housing 20 is held in the other hand. The ergonomic design of the tape measure 10 facilitates measurements using only one hand to hold the tape measure housing 20. After the tape 36 is pulled from the tape measure housing 20, the lock actuator 24 can be moved with the thumb of the hand holding the tape measure housing 20 to clamp the tape 36 at a desired position.

The tape 36 includes indicia 40 of distances along its length corresponding to standard measurement increments. A workman can then use the indicia of distances. When the lock actuator 24 is released, the self-powered, reel assembly 18 pull the tape 36 back into the housing 20 until the tape stop 42 comes to rest against the bumper 30.

Certain modifications and improvements will occur to those skilled in the art upon a reading of the foregoing description. By way of example, a shaft can be used in place of a spool on the spring take up spool, or the spring can be simply contained within the tape measure housing without being anchored to a shaft or wrapped around a spool. Additionally, the present invention can be constructed without a spacer gear if the gear ratio is adjusted properly. It should be understood that all such modifications and improvements have been deleted herein for the sake of conciseness and readability but are properly within the scope of the following claims.

We claim:

1. A tape measure having a self-powered, reel assembly comprising:
   (a) a primary spool having a measuring tape wound upon said primary spool;
   (b) a secondary biased spool assembly including: (i) a spring spool; (ii) a spring drive spool; and (iii) a backwound spring comprising a pair of spaced apart coils connected by a span crossing an axis common to the center of both coils; and
   (c) a coupler for connecting said primary spool to said secondary biased spool assembly for retracting said primary spool.

2. The device according to claim 1, further including a housing for receiving said primary spool; said secondary biased spool assembly; and said coupler.

3. The device according to claim 2, wherein said housing further includes grips.

4. The device according to claim 3, wherein said grips are finger grips.

5. The device according to claim 2, wherein said housing further includes a lock actuator for selectively clamping said measuring tape at a desired position during use.

6. The device according to claim 2, wherein said housing further includes a belt clip attached to said housing.

7. The device according to claim 6, wherein said belt clip is a tool belt clip for attaching said tape measure to a tool belt.

8. The device according to claim 2, wherein said housing further includes a tape bumper for reducing the impact of the end of said tape against said housing when said tape is retracted.

9. The device according to claim 2, wherein said housing may be opened to replace said measuring tape.

10. The device according to claim 9, wherein said housing further includes a plurality of fasteners for closing said housing.

11. The device according to claim 2, wherein said housing is generally rectangular and hand sized.

12. The device according to claim 2, wherein said housing includes at least one chamber for receiving said primary spool; said secondary biased spool assembly; and said coupler.

13. The device according to claim 2, wherein said housing includes at least two chambers.

14. The device according to claim 13, wherein at least one of said chambers is sealed to prevent outside elements from entering said sealed chamber.

15. The device according to claim 1, wherein said measuring tape includes measuring indicia in predetermined increments.

16. The device according to claim 15, wherein said measuring tape includes an end stop to prevent said measuring tape from retracting completely into said housing.

17. A self-powered, reel assembly for use in a tape measure, said self-powered reel assembly comprising:
   (a) a primary spool;
   (b) a secondary biased spool assembly having (i): a spring spool; (ii) a spring drive spool; and (iii) a backwound spring comprising a pair of spaced apart coils connected by a span crossing an axis common to the center of both coils; and
   (c) a coupler for connecting said primary spool to said secondary biased spool assembly for retracting said primary spool.

18. The device according to claim 17, wherein said primary spool is a take-up spool.

19. The device according to claim 17, wherein the ratio of the diameter of said primary spool to the diameter of said secondary biased spool assembly is less than 1 to 1 for increasing the mechanical advantage of said secondary biased spool assembly.

20. The device according to claim 17, wherein said backwound spring is substantially relaxed at rest.

21. The device according to claim 17, wherein said coupler includes a first drive gear on said primary spool and a second drive gear on said spring drive spool.

22. The device according to claim 21, wherein said coupler further includes a spacer gear between said first drive gear and said second drive gear.

23. The device according to claim 22, wherein the number of teeth on said spacer gear is about equal to the number of teeth on said first drive gear of said primary spool.

24. A tape measure, said tape measure comprising:
   (a) a self-powered, reel assembly including: (i) a primary spool having a measuring tape wound upon said primary spool; (ii) a secondary biased spool assembly having: a spring spool; a spring drive spool; and a backwound spring comprising a pair of spaced apart coils connected by a span crossing an axis common to the center of both coils; (iii) a coupler for connecting said primary spool to said secondary biased spool assembly for retracting said primary spool; and (b) a housing for receiving said self-powered, reel assembly.

25. The device according to claim 24, wherein said housing further includes grips.

26. The device according to claim 25, wherein said grips are finger grips.

27. The device according to claim 24, wherein said housing further includes a lock actuator for selectively clamping said measuring tape at a desired position during use.

28. The device according to claim 24, wherein said housing further includes a belt clip attached to said housing.

29. The device according to claim 28, wherein said belt clip is a tool belt clip for attaching said tape measure to a tool belt.

30. The device according to claim 24, wherein said housing further includes a tape bumper tape bumper for reducing the impact of the end of said tape against said housing when said tape is retracted.

31. The device according to claim 24, wherein said housing may be opened to replace said measuring tape.

32. The device according to claim 31, wherein said housing further includes a plurality of fasteners for closing said housing.

33. The device according to claim 24, wherein said housing is generally rectangular and hand sized.

34. The device according to claim 24, wherein said housing includes at least one chamber for receiving said primary spool; said secondary biased spool assembly; and said coupler.

35. The device according to claim 24, wherein said housing includes at least two chambers.

36. The device according to claim 35, wherein at least one of said chambers is sealed to prevent outside elements from entering said sealed chamber.

37. The device according to claim 24, wherein said measuring tape includes measuring indicia in predetermined increments.

38. The device according to claim 37, wherein said measuring tape includes an end stop to prevent said measuring tape from retracting completely into said housing.

39. The device according to claim 24, wherein said primary spool is a take-up spool.

40. The device according to claim 24, wherein the ratio of the diameter of said primary spool to the diameter of said secondary biased spool assembly is less than 1 to 1 for increasing the mechanical advantage of said secondary biased spool assembly.

41. The device according to claim 24, wherein said backwound spring is substantially relaxed at rest.

42. The device according to claim 24, wherein said coupler includes a first drive gear on said primary spool and a second drive gear on said spring drive spool.

43. The device according to claim 42, wherein said coupler further includes a spacer gear between said first drive gear and said second drive gear.

44. The device according to claim 43, wherein the number of teeth on said spacer gear is about equal to the number of teeth on said first drive gear of said primary spool.

* * * * *

UNITED STATES PATENT AND TRADEMARK OFFICE
CERTIFICATE OF CORRECTION

PATENT NO. : 7,003,895 B2
APPLICATION NO. : 10/264293
DATED : February 28, 2006
INVENTOR(S) : Harris et al.

It is certified that error appears in the above-identified patent and that said Letters Patent is hereby corrected as shown below:

Column 4,
Line 33, insert a period after "7".
Line 46, delete the comma between the words "more" and "compact".
Line 54, after the word "long", insert a dash mark so as to read -- long - the.... --.

Signed and Sealed this

Twenty-fifth Day of July, 2006

JON W. DUDAS
*Director of the United States Patent and Trademark Office*